US012667090B1

(12) United States Patent
     Paez

(10) Patent No.: US 12,667,090 B1
(45) Date of Patent: Jun. 30, 2026

(54) FISHING LINE GUIDE FOR NET ASSEMBLY

(71) Applicant: Roberto Paez, Miami, FL (US)

(72) Inventor: Roberto Paez, Miami, FL (US)

( * ) Notice: Subject to any disclaimer, the term of this patent is extended or adjusted under 35 U.S.C. 154(b) by 0 days.

(21) Appl. No.: 19/028,445

(22) Filed: Jan. 17, 2025

(51) Int. Cl.
     *A01K 77/00* (2006.01)

(52) U.S. Cl.
     CPC .................................... *A01K 77/00* (2013.01)

(58) Field of Classification Search
     CPC ........ A01K 77/00; A01K 75/00; A01K 87/04;
                 A01K 77/005; B62J 2001/085; G05G
                 1/04; G05G 1/06; F61L 23/06; F61L
                 23/10; F61L 23/18; F61L 37/18
     USPC ......... 43/7, 11, 12, 24; 242/157, 615, 615.3;
                 226/196.1; 248/218.4, 219.1, 229.1,
                 248/229.11, 229.13, 229.14, 229.2,
                 248/229.21, 229.23, 229.24, 230.1, 230.2,
                 248/230.4, 230.5, 230.8, 239.9, 227.1,
                 248/302–304, 309.2; 403/290
     See application file for complete search history.

(56) References Cited

U.S. PATENT DOCUMENTS

| | | | | | |
|---|---|---|---|---|---|
| 1,736,624 | A | * | 11/1929 | Richardson ............. | A01K 77/00 |
| | | | | | 43/11 |
| 2,514,929 | A | * | 7/1950 | Brandt .................... | A01K 87/04 |
| | | | | | 43/25 |
| 2,775,806 | A | * | 1/1957 | Love ........................ | F16L 33/12 |
| | | | | | 24/271 |
| 3,156,998 | A | * | 11/1964 | Mcdaniel ............. | A01K 89/015 |
| | | | | | 43/25 |

| | | | | | |
|---|---|---|---|---|---|
| 3,309,810 | A | * | 3/1967 | Hannon .................. | A01K 87/04 |
| | | | | | 43/25 |
| 3,705,737 | A | * | 12/1972 | Westerlund ............. | F16L 23/06 |
| | | | | | 285/365 |
| 3,766,681 | A | * | 10/1973 | Mander .................. | A01K 91/08 |
| | | | | | 411/964 |
| 3,815,272 | A | * | 6/1974 | Marleau .................. | A01K 77/00 |
| | | | | | 43/12 |
| 4,263,864 | A | * | 4/1981 | Carter, Jr. .............. | A01K 77/00 |
| | | | | | 114/221 R |

(Continued)

FOREIGN PATENT DOCUMENTS

| | | | | |
|---|---|---|---|---|
| CA | 2713596 A1 | * | 9/2011 | ............... A45F 5/02 |
| CN | 216961216 U | * | 7/2022 | |

(Continued)

OTHER PUBLICATIONS

Translation of FR 974301 A (Year: 1951).*

*Primary Examiner* — Darren W Ark
(74) *Attorney, Agent, or Firm* — Albert Bordas, Esq.

(57) ABSTRACT

A fishing line guide for net assembly, made of a line guide assembly and a securing mechanism assemblies that is removably attaches onto a net. The line guide assembly has a hook with a distal end on one side and a vertical bar on the other. The vertical bar also has a corner with a horizontal bar and a proximal end. The securing mechanism assemblies are welded onto the horizontal bar. The securing mechanism assemblies have a distal bracket holding a bolt hinge. The distal bracket has a distal clearance notch. The distal clearance notch provides clearance for a bolt stem inserted into the bolt hinge to move. The securing mechanism assemblies also has a proximal bracket. The bolt stem which passes through the distal and the proximal brackets. The bolt stem culminates in a bolt head separated from the proximal bracket by a spacer.

11 Claims, 6 Drawing Sheets

(56) References Cited

U.S. PATENT DOCUMENTS

| | | | | |
|---|---|---|---|---|
| 4,292,753 A * | 10/1981 | Yesuratnam | A01K 77/00 | 43/7 |
| 4,571,875 A * | 2/1986 | Ballas | A01K 77/00 | 43/11 |
| 4,619,065 A * | 10/1986 | Jones | A01K 77/00 | 43/17.2 |
| 4,639,979 A * | 2/1987 | Polson | F16B 7/1418 | 285/373 |
| 4,643,460 A * | 2/1987 | Lieberg | F16L 17/04 | 285/365 |
| 4,772,153 A * | 9/1988 | Huang | B62K 19/18 | 403/373 |
| 4,815,227 A * | 3/1989 | Flanders, Sr. | A01K 77/00 | 43/7 |
| 5,029,409 A * | 7/1991 | Nouwens | A01K 89/003 | 242/615 |
| 5,048,222 A * | 9/1991 | Correll | A01K 80/00 | 43/104 |
| 5,479,836 A * | 1/1996 | Chang | E05C 5/04 | 70/201 |
| 5,548,918 A * | 8/1996 | Varrichione | A01K 87/00 | 43/25 |
| 5,988,694 A * | 11/1999 | Brushaber | F16L 23/06 | 285/365 |
| 6,199,883 B1 * | 3/2001 | Gable | B62J 15/00 | 280/852 |
| 6,948,878 B1 * | 9/2005 | Smith, Jr. | F16B 7/1418 | 70/261 |
| 7,448,297 B2 * | 11/2008 | Tiong | B62J 50/22 | 403/383 |
| 7,603,805 B1 * | 10/2009 | Lehmberg | A01K 77/00 | 43/7 |
| 7,624,530 B2 * | 12/2009 | Resch | A01K 77/00 | 43/17.5 |
| 7,883,121 B2 * | 2/2011 | Henry | F16L 23/10 | 285/410 |
| 7,975,424 B1 * | 7/2011 | Shooter, II | A01K 77/00 | 43/7 |
| 8,006,711 B2 * | 8/2011 | Pietrzak | A45B 9/00 | 135/65 |
| 8,201,852 B2 * | 6/2012 | Linhorst | F16L 23/06 | 285/365 |
| 8,256,983 B2 * | 9/2012 | Lin | B62K 25/02 | 403/322.4 |
| 8,328,458 B2 * | 12/2012 | Werth | F16L 23/10 | 403/313 |
| 8,608,118 B2 * | 12/2013 | Lai | F16B 7/1454 | 403/374.5 |
| 8,806,801 B2 | 8/2014 | Steffens | | |
| 9,151,420 B2 * | 10/2015 | McKiernan | F16L 23/10 | |
| 9,764,791 B2 * | 9/2017 | Nabet | B62K 25/02 | |
| 9,801,436 B2 * | 10/2017 | Blood | A45B 3/00 | |
| 10,051,930 B2 * | 8/2018 | Heim | A45B 9/00 | |
| 10,408,371 B2 * | 9/2019 | Floyd | F16L 23/10 | |
| 10,609,912 B2 * | 4/2020 | Snopkowski | A01K 91/04 | |
| 10,794,654 B2 * | 10/2020 | Burton | F16B 2/10 | |
| D912,350 S * | 3/2021 | Speak | D32/35 | |
| 11,079,048 B2 * | 8/2021 | Magagna | F16L 33/12 | |
| 11,166,442 B2 | 11/2021 | Vesich | | |
| 11,346,481 B2 * | 5/2022 | Bronnert | F16L 23/06 | |
| 11,540,497 B2 | 1/2023 | Hogan | | |
| 11,703,171 B2 * | 7/2023 | Hinton | F16L 23/06 | 285/312 |
| 11,752,015 B2 * | 9/2023 | Porter | A61F 2/78 | 623/32 |
| 11,974,555 B1 * | 5/2024 | Hamilton | A01K 87/007 | |
| 12,251,598 B2 * | 3/2025 | Moreira | B62K 19/36 | |
| 2002/0121041 A1 * | 9/2002 | Haggerty | A01K 97/14 | 43/5 |
| 2005/0005497 A1 * | 1/2005 | Boltan | A01K 77/00 | 43/7 |
| 2009/0080968 A1 * | 3/2009 | Parrett | B62K 19/36 | 403/290 |
| 2010/0038903 A1 * | 2/2010 | Linhorst | F16L 33/12 | 285/365 |
| 2010/0236128 A1 | 9/2010 | Murray | | |
| 2010/0319236 A1 | 12/2010 | Stebbing | | |
| 2011/0094145 A1 * | 4/2011 | Marx | A01K 77/00 | 43/11 |
| 2011/0162465 A1 | 7/2011 | Pekin | | |
| 2013/0097913 A1 * | 4/2013 | Hume | A01K 77/00 | 43/11 |
| 2016/0249594 A1 | 9/2016 | Gunnarsson | | |
| 2018/0014951 A1 * | 1/2018 | Toler | A61F 2/60 | |
| 2018/0185174 A1 * | 7/2018 | Porter | A61F 2/78 | |
| 2020/0053995 A1 * | 2/2020 | Andrews | A01K 77/00 | |
| 2020/0205385 A1 | 7/2020 | Bethea | | |
| 2021/0253191 A1 * | 8/2021 | Kole | B62J 1/08 | |
| 2021/0307308 A1 * | 10/2021 | Knight | B65H 49/34 | |
| 2022/0001947 A1 * | 1/2022 | Bond | B62J 1/08 | |
| 2022/0242510 A1 * | 8/2022 | Pfeiffer | B62K 23/06 | |
| 2024/0130342 A1 * | 4/2024 | Hamilton | A01K 77/00 | |
| 2025/0002104 A1 * | 1/2025 | Keen | B62J 1/28 | |

FOREIGN PATENT DOCUMENTS

| | | | | | |
|---|---|---|---|---|---|
| EP | 0522802 A1 * | 1/1993 | | A01K 77/00 | |
| FR | 912596 A * | 8/1946 | | | |
| FR | 931163 A * | 2/1948 | | | |
| FR | 974301 A * | 2/1951 | | | |
| FR | 1275051 A * | 11/1961 | | A01K 87/04 | |
| FR | 1464755 A * | 1/1967 | | A01K 87/04 | |
| FR | 2390665 A1 * | 12/1978 | | | |
| FR | 2573956 A1 * | 6/1986 | | A01K 91/08 | |
| GB | 2322279 A * | 8/1998 | | A01K 77/00 | |
| GB | 2460868 A * | 12/2009 | | A01K 91/02 | |
| JP | 2006197806 A * | 8/2006 | | | |
| JP | 2015000061 A * | 1/2015 | | | |
| JP | 2018161076 A * | 10/2018 | | | |
| JP | 2019118337 A | 7/2019 | | | |
| KR | 100860492 B1 * | 9/2008 | | A01K 97/10 | |
| KR | 200441870 Y1 * | 9/2008 | | A01K 97/00 | |
| KR | 20120005871 U * | 8/2012 | | A01K 77/00 | |
| KR | 200477077 Y1 * | 5/2015 | | | |
| WO | WO-2007055328 A1 * | 5/2007 | | A01K 89/015 | |
| WO | WO-2018022688 A1 * | 2/2018 | | A01K 99/00 | |

* cited by examiner

FISHING LINE GUIDE FOR NET ASSEMBLY

BACKGROUND OF THE INVENTION

The present invention relates to net assemblies, and more particularly, to fishing line guides for net assemblies.

PRIOR ART

Applicant believes that one of the closest references corresponds to U.S. Patent Application Publication No. 20100319236, published on 2010 Dec. 23 to Stebbing, Franklin Leroy for fishing gaff and net with a line guide. However, it differs from the present invention because Stebbing teaches a fish grabbing device that automatically grabs a fish when the fish explores, strikes or attempts to eat the bait. The grabber may include a coiled body having pointed ends that are held together by detents. When the fish explores the grabber and accompanying bait, the fish trips a trigger, which causes the movement of grabber ends such that they expand within the fish's mouth, thereby catching the fish.

Applicant believes that another reference corresponds to U.S. Patent Application Publication No. 20020121041, published on 2002 Sep. 5 to Haggerty, Jane for fishing gaff and net with a line guide. However, it differs from the present invention because Haggerty teaches a function to standard fishing gaffs of fishing nets to guide the fishing line clear of obstacles using the same gaff or net used to land the fish.

Applicant believes that another reference corresponds to U.S. Patent Application Publication No. 20160249594, published on 2016 Sep. 1 to Gunnarsson; Gudmundur for fishing net frame line and codend with improved fish escape properties. However, it differs from the present invention because Gunnarsson teaches a lace line for forming structures including netting, such as codends, trawl nets, seines and fish pens, The lace line includes at least several distinct loop tails that are interlaced and/or interconnected with one another so as to form several lacing loops, In other aspects, the present disclosure teaches a codend including at least four hung-in riblines having at least four netting panels formed mainly and preferably entirely of T90 mesh, where the T90 mesh mainly and preferably entirely includes a mesh size of between one hundred sixty and one hundred ninety five millimeters, in combination with a hang percentage of between ten and twenty four percent.

Applicant believes that another reference corresponds to U.S. Patent Application Publication No. 20110162465, published on 2011 Jul. 7 to Pekin; David for force measurement system. However, it differs from the present invention because Pekin teaches embodiments of force measurement systems. In one embodiment, the force measurement system is implemented in a fishing rod system, to measure tension applied to the fishing line. Other embodiments include a fishing gaff used to gaff fish, and with a measurement system for providing an indication of the weight of a gaffed fish. Yet another embodiment is implemented in a fishing net, with a measurement system for providing an indicated of the weight of a netted fish or other netted object. A still further application for the force measurement system is in a shaft tension coupler.

Applicant believes that another reference corresponds to U.S. Patent Application Publication No. 20130097913, published on 2013 Apr. 25 to Hume; Daniel R. for Coverable Fish Net Apparatus. However, it differs from the present invention because Hume teaches a coverable fish net apparatus that provides for easily netting a fish and selectively covering a first frame with a large net and a second frame with small net. A strap is disposed on a second end of the first frame and a clip is disposed on an outer end thereof. The second frame is slideably positioned on the handle via a lock mechanism including positions partially over and completely over the first frame toy trap a fish within. A strap is disposed on the second end and a clip is disposed on an outer end thereof. A hook is pivotally disposed on an apex of the second frame. Effectively netting, and revival prior to release, of varying sizes of fish is thereby best accomplished, with less chance of fish escape.

Applicant believes that another reference corresponds to U.S. Patent Application Publication No. 20050005497, published on 2005 Jan. 13 to Boltan, Zinaida for Methods and Devices of the Net Apparatus, the Fishing Rod and The Spinning Mechanism Combination. However, it differs from the present invention because Boltan teaches new methods and devices of a collapsible fish scoop-net apparatus, or hoop-net apparatus to catch insects, animals, birds and others. The opening of a net support frame, made from elastic material, can be closed in any fishing, or hunting situation by hand or automatically from a spring, electric or other power source, when the caught fish, animal or other catch is inside the net. All proposed methods of fish scoop-net apparatus can also act as a device together with a fishing rod instead of a hand lever. The separate method relates to a soft net with a plummet, as a conjoint device with a fishing-rod, or with a fish-lure, or with a fish-bobber, where a soft net, driven by the force of a weight, slides over and along the fishing-line, then over the caught fish, entangling the back of the flippers, gills and flanks.

Applicant believes that another reference corresponds to U.S. Patent Application Publication No. 20240130342, published on 2024 Apr. 25 to Hamilton; Joseph for Marine Animal Netting Device and Method of Use. However, it differs from the present invention because Hamilton teaches a marine animal netting device for catching crabs that includes a pole, which is selectively extensible. A net is pivotally attached to the pole proximate to a first end of the pole and a handle attached to a second end of the pole. A line is loopedly positioned on and selectively extensible from a reel, which is attached to the handle, through line guides attached to the pole, and past the net. A connector, which is attached to a terminus of the line, is used to connect a bait. The handle is gripped in a hand of a user to manipulate the net and the bait into a body of water to attract a marine animal. The reel is used to reel in the bait and the marine animal into a position over the net, allowing the user to raise the net to catch the marine animal.

Applicant believes that another reference corresponds to U.S. Patent Application Publication No. 20100236128, published on 2010 Sep. 23 to Murray; Rudolph Augustus for ROLLER FISHING LINE GUIDE FOR A FISHING ROD. However, it differs from the present invention because Murray teaches a roller fishing line guide device for a fishing rod, comprising inter alia, a guide frame having a rod mounting bracket configured for mounting the guide frame to a fishing rod, a guide frame body, a roller means mounting bracket and a grooved disc shaped roller means with bearings to reduce the friction resulting from repeated contact between the fishing line and the fishing line guide rings. The roller means is secured to the roller means mounting bracket using an interlocking threaded axis.

Applicant believes that another reference corresponds to U.S. Patent Application Publication No. 20200205385, published on 2020 Jul. 2 to Bethea; Arnold for HANDHELD CRABTRAP SYSTEM. However, it differs from the present invention because Bethea teaches a handheld crabtrap for catching crabs that includes a shaft having a handle with a lever on a proximal end, a trap head with a lid at a distal end of the shaft, and a linkage within the shaft attached to the lever and the trap head. The handle further includes a crab alert bell attached to a cable that also extends to and into the trap head, where it ends in a clip to which the crabber's bait is attached. The trap head is held open via the linkage and lever until a crab pulls on the bait ringing the bell and alerting a crabber to pull on the lever and close the trap head via a string there between.

Applicant believes that another reference corresponds to U.S. Pat. No. 7,624,530 issued to Resch; Christopher T. on 2009 Dec. 1 for Fishing Net. However, it differs from the present invention because Resch teaches a fishing net that includes a hoop having a net defining a catch area and having an array of illumination elements on the hoop. A bracket connects first and second ends of the hoop and defines a passage therebetween. The fishing net includes a handle coupled to the bracket and movable through the passage between use and storage configurations. A lantern is coupled to a distal end of the handle relative to the hoop, the lantern being movable between retracted, extended, and offset configurations relative to the handle. The fishing net includes a flexible shaft having a light element and that is movable between a retracted configuration in the handle and an extended configuration extending from the handle adjacent the hoop for illuminating a specific area.

Applicant believes that another reference corresponds to U.S. Pat. No. 11,540,497 issued to Hogan; Vincent George on 2023 Jan. 3 for Foldable Lobster Net. However, it differs from the present invention because Hogan teaches a foldable handheld net having a handle portion defining a first end of the lobster net, a net frame assembly with a first and second frame members forming at least a portion of the handle portion and each having magnets or another fastener disposed thereon, wherein the first and second frame members have a meshed net attached thereto and are operably configured to selectively rotate and selective couple with respect to one another and be retained in a folded position along a frame translation path with the magnets or fasteners. Additionally, the handle portion may have tickling stick selectively removably coupled thereto for detachment and use by the user.

Applicant believes that another reference corresponds to U.S. Pat. No. 11,166,442 issued to Vesich; Anthony on 2021 Nov. 9 for Net Having Hoop Frame Connected to Handle. However, it differs from the present invention because Vesich teaches a hoop frame connected to a pole by a yoke. The yoke defines sockets in which respective arms of the hoop frame and a distal end of the pole are received. Plugs in the arms of the hoop frame desirably prevent water from passing the plugs into the hoop frame. A plug in the distal end of the pole desirably prevents water from passing the plug into the pole. The yoke and plugs provide a robust connection of the hoop frame to the pole and help retain air in the hoop frame and pole for buoyancy of the net.

Applicant believes that another reference corresponds to U.S. Pat. No. 9,801,436 issued to Blood; Jeffrey L. on 2017 Oct. 31 for Walking/wading Staff with Integral Fishing Net. However, it differs from the present invention because Blood teaches a preferred embodiment includes a retractable, extensible pole that can be moved between a first, fully compacted (retracted) configuration for transport or storage and second, fully extended configuration for wading, especially when traversing a stream or riverbed for fly-fishing.

Other embodiments include a hook extension from the lower staff end for retrieving tangled lines, lures and the like.

Applicant believes that another reference corresponds to U.S. Pat. No. 4,263,864 issued to Carter, Jr., deceased; Roy N. on 1981-04-28 for Buoyant Net And Retrieval Device. However, it differs from the present invention because Carter teaches an extensible-handle buoyant net and retrieval device having a handle member made of telescoping tubes sealed at their joints by a packing gland, the handle member being sealed at one end by an inserted hook member and carrying a fork member at its other end, the fork member having a block pivotally connected thereto supporting a net frame, and the fork member and block forming a pivotal joint carrying a lock for fixing the angle of the net frame to a selected one of multiple predetermined angular positions, the frame and handle members being made of hollow plastic tubing.

Applicant believes that another reference corresponds to U.S. Pat. No. 4,619,065 issued to Jones; Stephen S. on 1986 Oct. 28 for Combination Fishnet and Fishhook Retriever. However, it differs from the present invention because Jones teaches a combination fishing net and snagged-hook retriever having a tubular handle with a telescopically extendable member carried within. The extension member is axially removable from the net handle when retrieval of a snagged hook is necessary. A preferred hook retriever is a split-ring device having a pair of bent arms which substantially encircle the line proximate to the hook, enabling multi-directional forces to be applied to the hook resulting in its disengagement.

Applicant believes that another reference corresponds to U.S. Pat. No. 8,806,801 issued to Steffens on Aug. 19, 2014 for Fish landing net. However, it differs from the present invention because Steffens teaches a landing net having a net member attached to a connecting member that is attached to a handle. The connecting member has at least two locking rings and a receiver attached to each locking ring. Each locking ring has a bushing attached to an inner surface of the ring. The receivers have a non-circular shape and extend parallel to a central axis of the rings.

Applicant believes that another reference corresponds to U.S. Pat. No. 4,815,227 issued to Flanders, Sr. on Mar. 28, 1989 for Anti-drifting fish landing net. However, it differs from the present invention because Flanders teaches a fish landing net having a cord attached to the apex of the net webbing for preventing drifting of the webbing during landing of a fish. One end of the cord is attached to the apex of the webbing and the other is attached to a weight slidably received within the hollow portion of the landing net handle.

Applicant believes that another reference corresponds to U.S. Pat. No. 7,975,424 issued to Shooter, II; John Francis on 2011 Jul. 12 for Castable Framed Fish Catching Net. However, it differs from the present invention because Shooter, II teaches an embodiment of a castable fish catching net device operable by one person for capturing aquatic animals from any body of water without the need for the operator to enter the water. Includes a purse type seine supported by a generally triangular frame which is heavier than the surrounding water thus providing a sinking force. A handle is attached to the apex of the triangular frame extending in towards the center of the frame. A casting and retrieval cord is attachable to the most center end of the handle. Buoyant means is provided to orient the fish catching net device in a substantially vertical attitude relative to the surface of the body of water as it descends into the water. The purse shaped net has membranes that generate a buoyant-force as the fish catching net device is dragged through the water thus providing the operator with the ability to control the depth of deployment by varying the speed of forward travel through the water.

Applicant believes that another reference corresponds to U.S. Pat. No. D912350 issued to Speak; Brent on 2021 Mar. 2 for Net with Hook. However, it differs from the present invention because Speak teaches an ornamental design for a skimmer net with hook.

Other patents describing the closest subject matter provide for a number of more or less complicated features that fail to solve the problem in an efficient and economical way. None of these patents suggest the novel features of the present invention.

SUMMARY OF THE INVENTION

The present invention is a fishing line guide for net assembly, comprising a line guide assembly and securing mechanism assemblies that are removably attached onto a handle of a net assembly.

The line guide assembly comprises a hook, the hook comprises a distal end on one side and a vertical bar. The vertical bar defines a corner with a horizontal bar and a proximal end. The securing mechanism assemblies are fixed onto the horizontal bar.

The securing mechanism assemblies comprise distal brackets holding bolt hinges. The distal brackets have distal clearance notches. The distal clearance notches provide clearance for bolt stems inserted into the bolt hinges allowing them to move.

The securing mechanism assemblies also comprise proximal brackets. The bolt stems pass through the distal brackets and the proximal brackets. The bolt stems culminate in bolt heads separated from the proximal brackets by spacers. The spacers maintain a consistent distance between the proximal brackets and the bolt heads.

The bolt heads attach to latch hinges in order to give latches mobility. The latches are used to securely attach the securing mechanism assemblies to the handle of the net assembly. The latches comprise thumb holds.

The securing mechanism assemblies contain a second spacer. The second spacer protects the handle of the net assembly in the event the securing mechanism assemblies are overtightened.

The securing mechanism assemblies are adjustable in order to accommodate the handle of a net assembly of any dimension.

The thumb holds allow for easier closure of said latches. There are at least two of the securing mechanism assemblies.

It is therefore one of the main objects of the present invention to provide a fishing line guide for net assembly that eases the transition from hook to net when fishing.

It is another object of this invention to provide a fishing line guide for net assembly that is volumetrically efficient for carrying, transporting, and storage.

It is another object of this invention to provide a fishing line guide for net assembly that can be readily assembled and disassembled without the need of any special tools.

It is another object of this invention to provide a fishing line guide for net assembly, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF DRAWINGS

With the above and other related objects in view, the invention consists in the details of construction and combination of parts as will be more fully understood from the following description, when read in conjunction with the accompanying drawings in which.

DETAILED DESCRIPTION OF THE INVENTION

Figure 1:
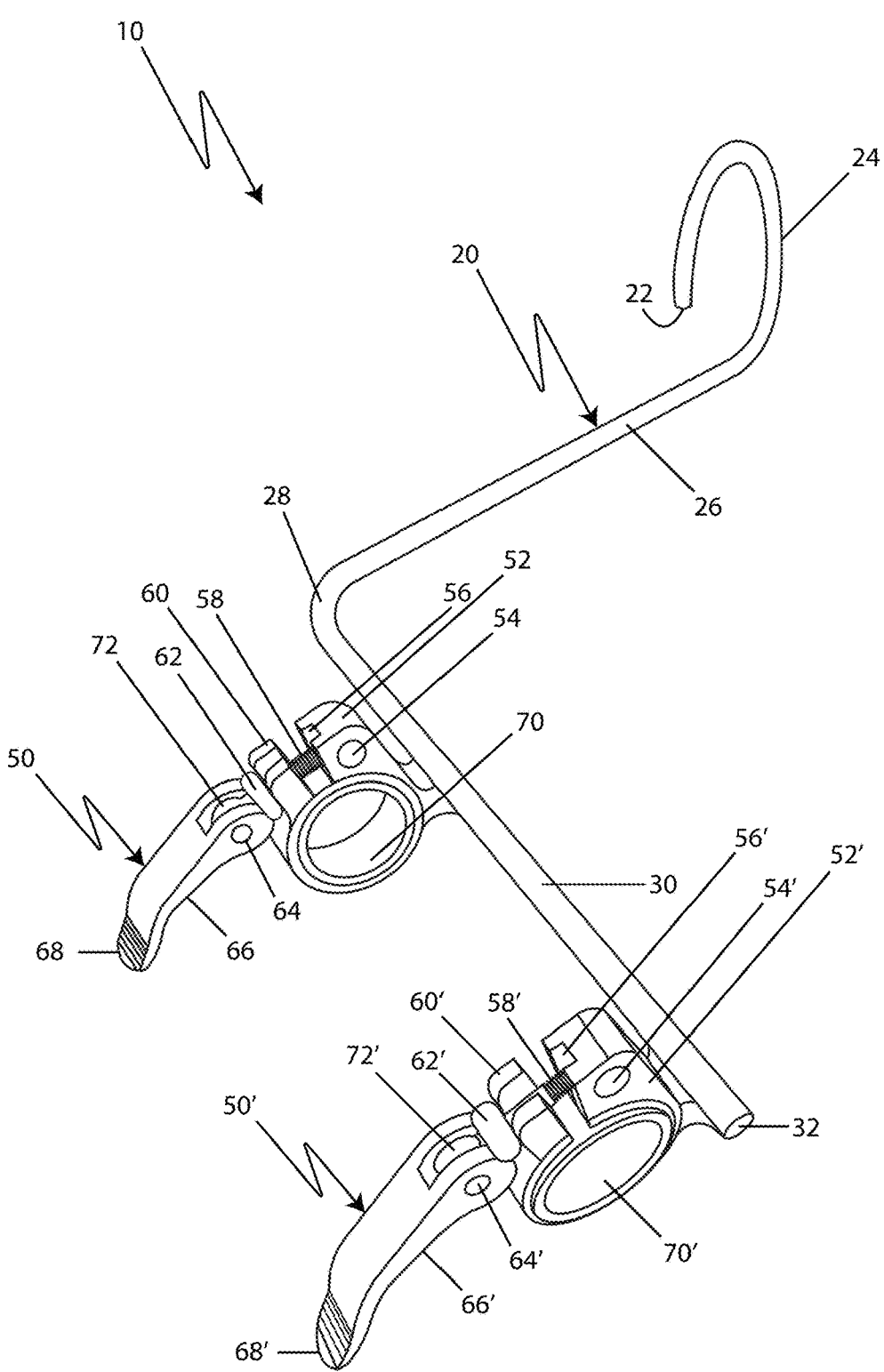
FIG. 1 represents an isometric view of the present invention.

Referring now to the drawings, the present invention is generally referred to with numeral 10. It can be observed that it basically includes line guide assembly 20 and securing mechanism assemblies 50 and 50'.

Figure 2:
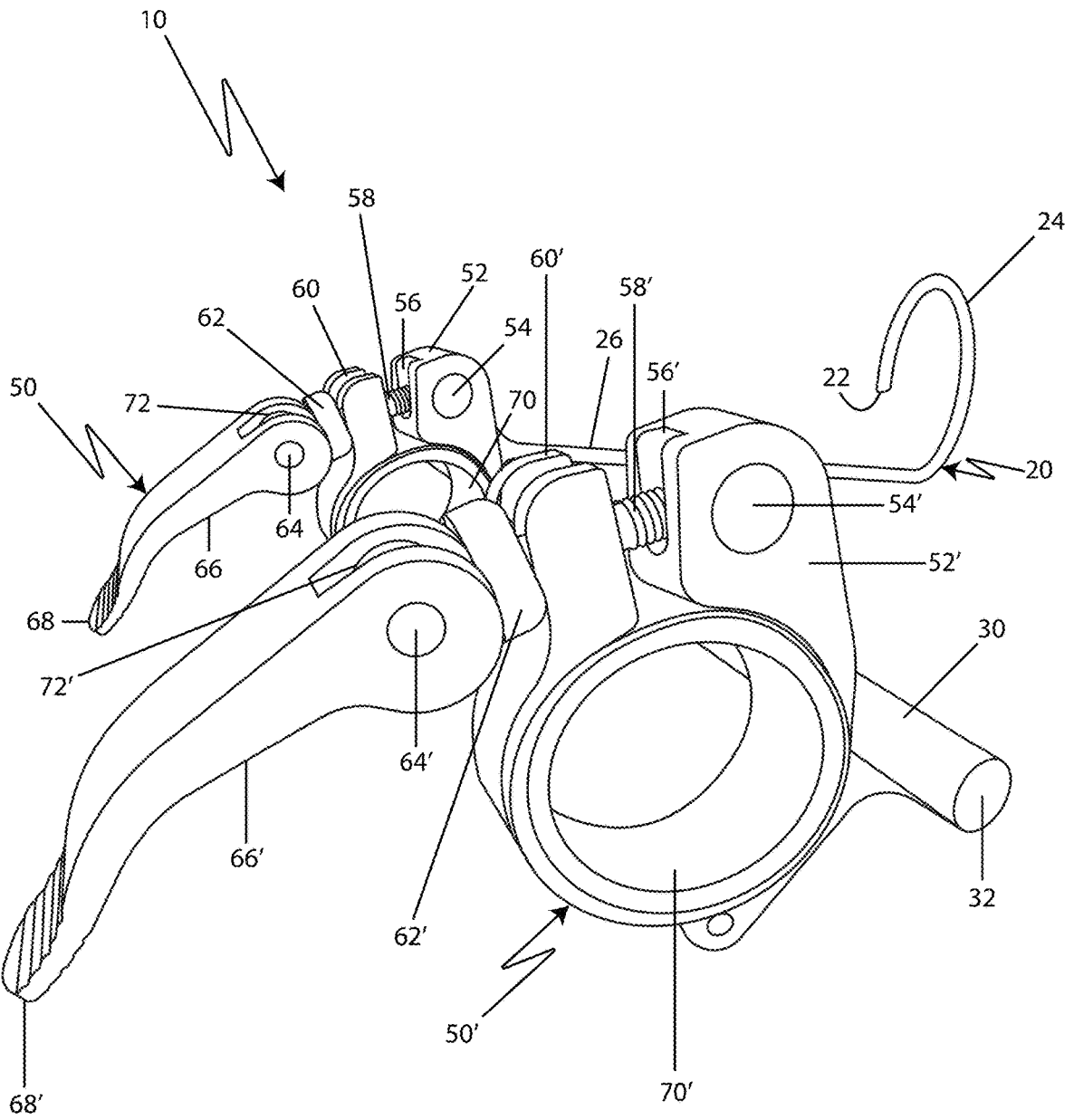
FIG. 2 is a front isometric view of the present invention.

As seen in FIGS. 1 and 2, line guide assembly 20 comprises of hook 24 which ends with distal end 22 and vertical bar 26. Vertical bar 26 ends with corner 28, which connects to horizontal bar 30, and culminates in proximal end 32. There are at least two securing mechanism assemblies 50 and 50' are secured to line guide assembly 20 by welding to horizontal bar 30.

Securing mechanism assemblies 50 and 50' comprises distal brackets 52 and 52' holding bolt hinges 54 and 54'. The distal brackets 52 and 52' have distal clearance notches 56 and 56'. Distal clearance notches 56 and 56' provides clearance for bolt stems 58 and 58' inserted into bolt hinges 54 and 54'.

Securing mechanism assemblies 50 and 50' also comprise proximal brackets 60 and 60'. Bolt stems 58 and 58' passes through distal brackets, 52 and 52', and proximal brackets, 60 and 60'. Bolt stems 58 and 58' culminates in bolt heads 72 and 72' which is separated from proximal brackets 60 and 60' by spacers 62 and 62'. Spacers 62 and 62' keep a consistent distance between proximal brackets, 60 and 60', and bolt heads 72 and 72'.

Bolt heads, 72 and 72', attach to latch hinges, 64 and 64', giving latches, 66 and 66', mobility. Latches 66 and 66' have thumb holds 68 and 68' respectively.

Securing mechanism assemblies 50 and 50' contain second spacers 70 and 70' respectively.

Figure 3:
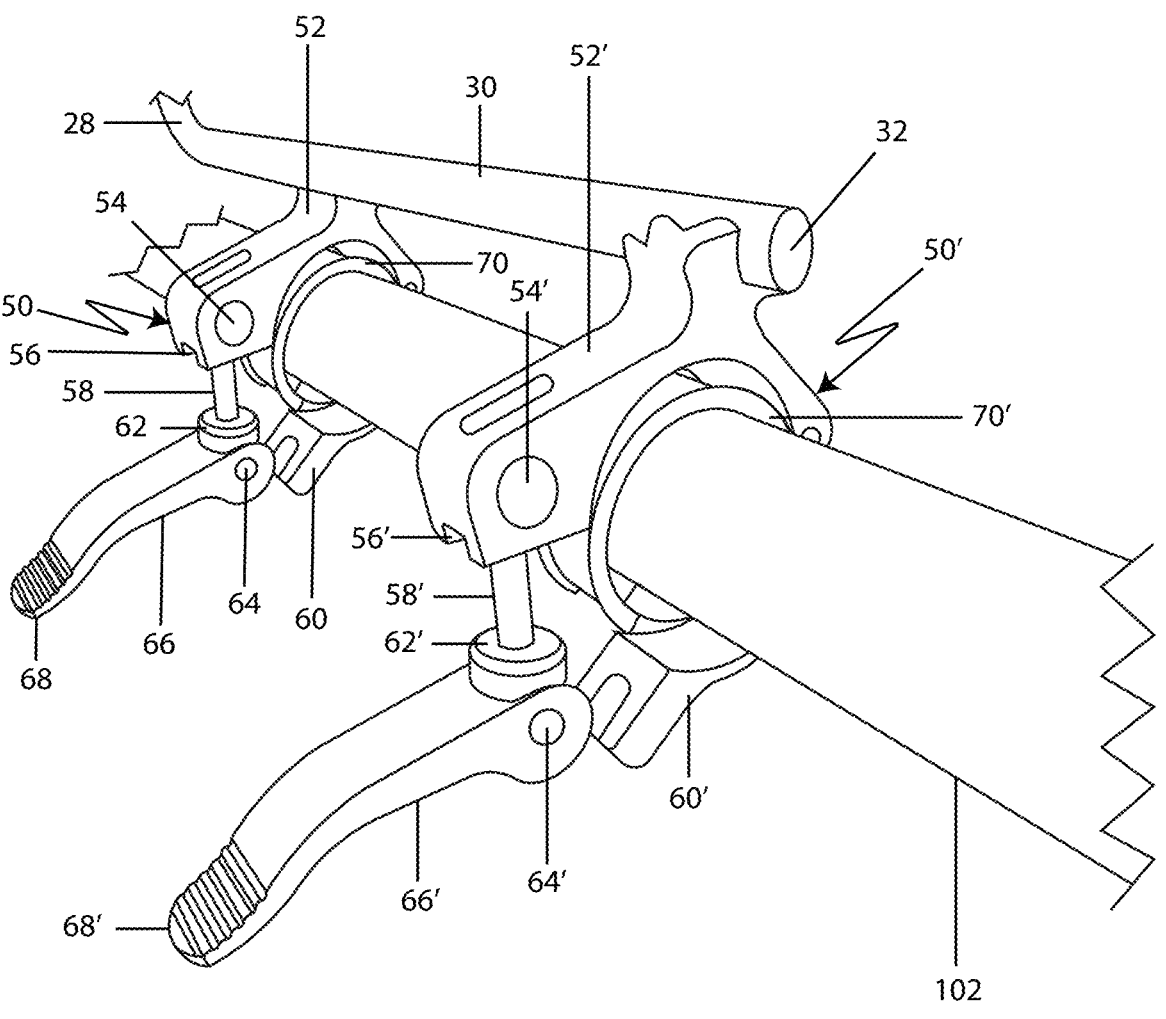
FIG. 3 is an isometric closeup view of securing mechanisms removably placed onto a handle of a fishing net.
Figure 4:
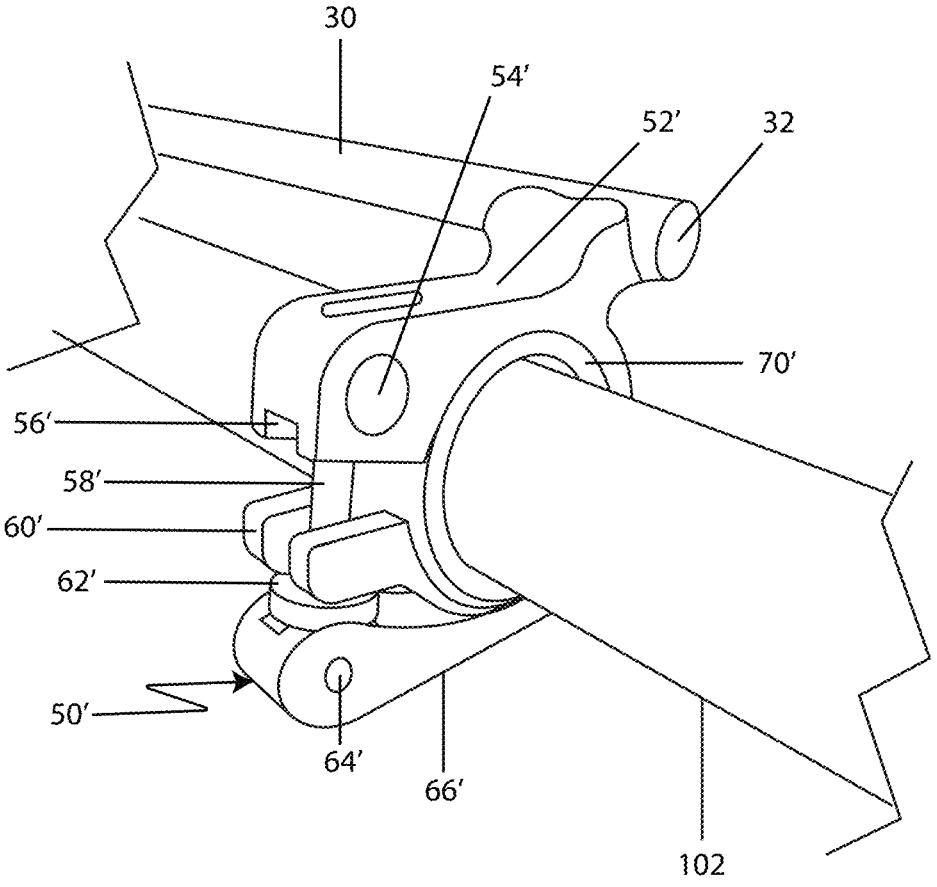
FIG. 4 is a closeup isometric view of a securing mechanism removably attached to the handle.

As seen in FIGS. 3 and 4, securing mechanism 50 and 50' removably attach to handle 102 of net assembly 100.

Figure 5:
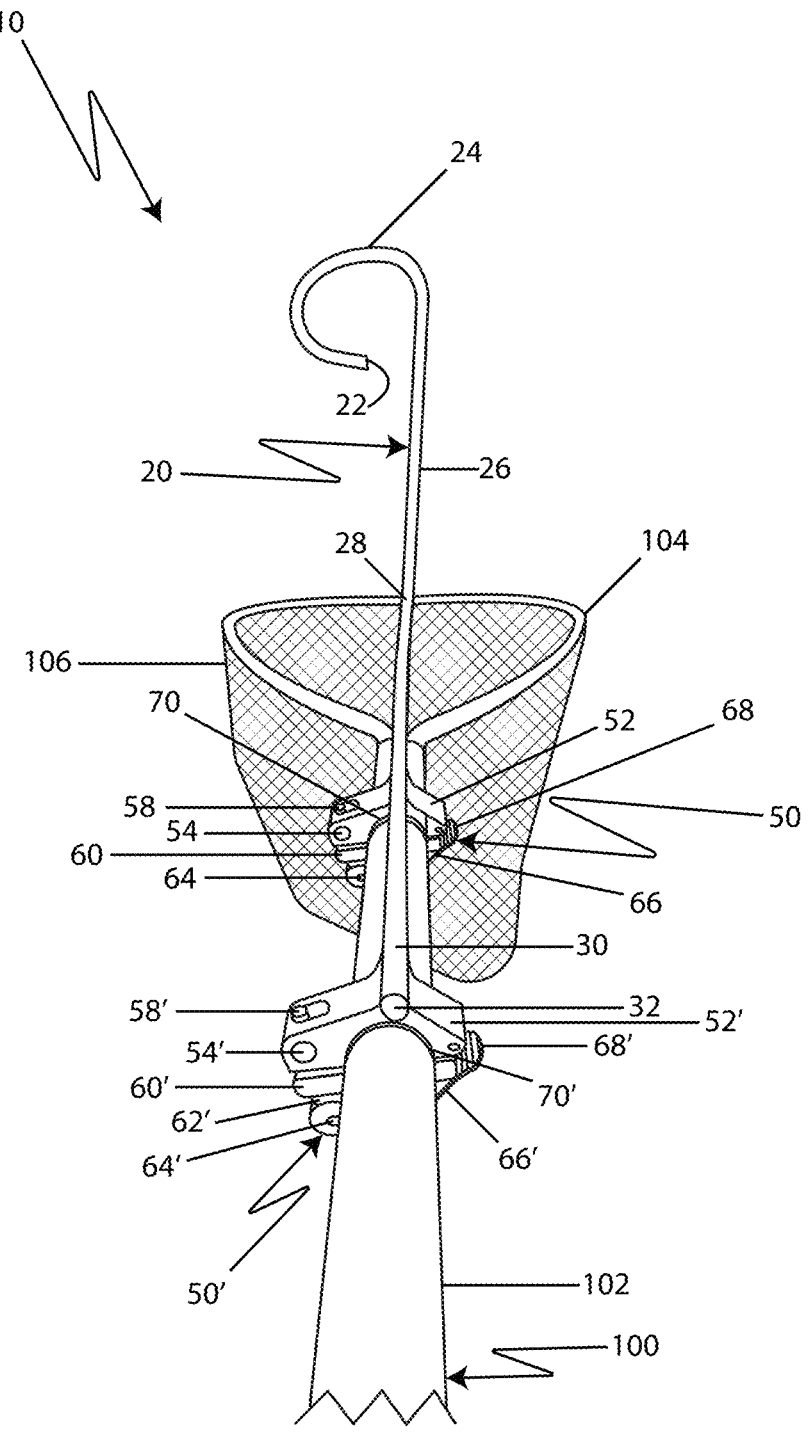
FIG. 5 is a first isometric view of the present invention secured onto the handle of the fishing net.

As seen in FIG. 5, present invention 10 can be removably attached to net assembly 100. Net assembly 100 comprises handle 102 attached to frame 104 which holds net 106.

Figure 6:
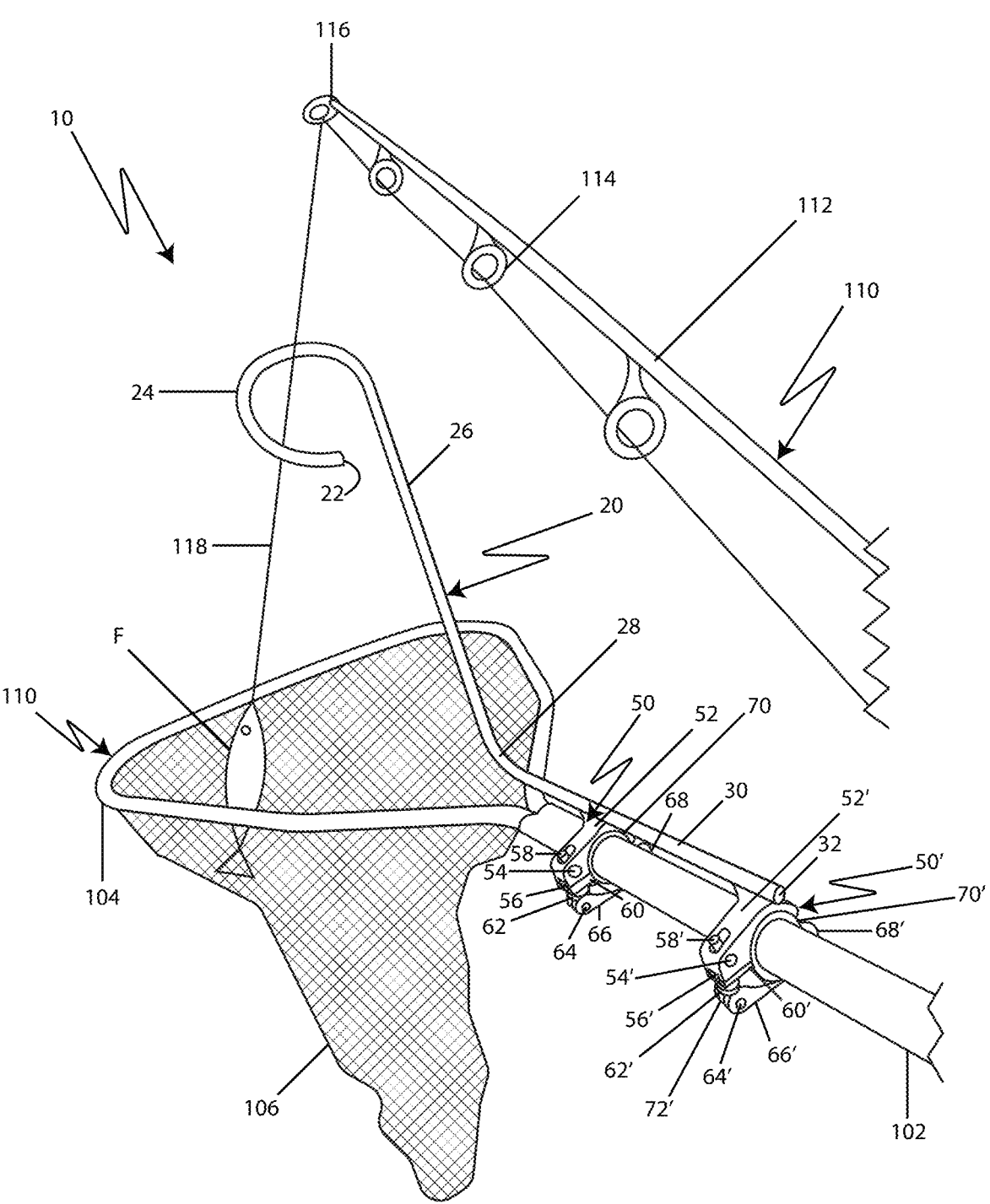
FIG. 6 is a second isometric view of the present invention secured onto the handle of the fishing net in use to guide a fish hooked on a fishing line towards the fishing net.

As seen in FIG. 6, once present invention 10 is attached to net assembly 100, fishing line 118 of fishing rod assembly 110 passes through hook 24 which guides fishing line 118, directly into net 106 allowing for fish F to easily be caught in net 106.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A fishing line guide in combination with a net assembly, comprising:

A) a line guide assembly comprising a hook, said hook comprises a distal end of the line guide assembly at one end of the hook and a vertical bar at an other end of the hook, said vertical bar defining a corner with a horizontal bar at one end of said horizontal bar and an other end of said horizontal bar comprises a proximal end of the line guide assembly, whereby a predetermined angle is defined between said vertical bar and said horizontal bar whereby said corner is a vertex of said angle, wherein said hook comprises a first section extending away from the vertical bar at the other end of the hook toward an intermediate section of said hook and a second section that both extends back toward the vertical bar from said intermediate section of said hook and terminates at the distal end of the line guide assembly, and wherein said first section, intermediate section, and second section define an opening of said line guide assembly; and B) securing mechanism assemblies that are removably attached onto a handle of the net assembly, said securing mechanism assemblies comprise distal brackets holding bolt hinges and proximal brackets, said distal brackets have distal clearance notches, said securing mechanism assemblies are fixed onto said horizontal bar, said distal clearance notches provide clearance for bolt stems inserted into said bolt hinges allowing them to move, said securing mechanism assemblies are adjustable in order to accommodate said handle of said net assembly of any dimension, said securing mechanism assemblies are fixed onto said horizontal bar by welding to said horizontal bar.

2. The fishing line guide in combination with a net assembly set forth in claim 1, wherein said bolt stems pass through said distal brackets and said proximal brackets.

3. The fishing line guide in combination with a net assembly set forth in claim 1, wherein said bolt stems culminate in bolt heads separated from said proximal brackets by spacers.

4. The fishing line guide in combination with a net assembly set forth in claim 3, wherein said spacers maintain a consistent distance between said proximal brackets and said bolt heads.

5. The fishing line guide in combination with a net assembly set forth in claim 3, wherein said bolt heads attach to latch hinges attached to latches in order to give said latches mobility.

6. The fishing line guide in combination with a net assembly set forth in claim 5, wherein said latches are used to securely attach said securing mechanism assemblies to said handle of said net assembly.

7. The fishing line guide in combination with a net assembly set forth in claim 5, wherein said latches comprise thumb holds.

8. The fishing line guide in combination with a net assembly set forth in claim 7, wherein said thumb holds allow for easier closure of said latches.

9. The fishing line guide in combination with a net assembly set forth in claim 1, wherein each of said securing mechanism assemblies contain a second spacer.

10. The fishing line guide in combination with a net assembly set forth in claim 9, wherein said second spacer protects said handle of said net assembly in the event said securing mechanism assemblies are overtightened.

11. The fishing line guide in combination with a net assembly set forth in claim 1, wherein there are at least two of said securing mechanism assemblies.

* * * * *